United States Patent
Wei et al.

(10) Patent No.: US 10,509,727 B1
(45) Date of Patent: Dec. 17, 2019

(54) METHOD AND APPARATUS FOR PERFORMING TASK-LEVEL CACHE MANAGEMENT IN ELECTRONIC DEVICE

(71) Applicant: MEDIATEK INC., Hsin-Chu (TW)

(72) Inventors: Sheng-Ju Wei, Hsinchu (TW); Jia-Ming Chen, Hsinchu (TW); I-Cheng Cheng, Hsinchu (TW); Shun-Chieh Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/125,780

(22) Filed: Sep. 10, 2018

(51) Int. Cl.
*G06F 12/00* (2006.01)
*G06F 12/0888* (2016.01)
*G06F 12/0875* (2016.01)

(52) U.S. Cl.
CPC ...... *G06F 12/0888* (2013.01); *G06F 12/0875* (2013.01); *G06F 2212/1016* (2013.01)

(58) Field of Classification Search
None
See application file for complete search history.

(56) References Cited

U.S. PATENT DOCUMENTS

| | | | | |
|---|---|---|---|---|
| 7,711,902 B2* | 5/2010 | Pong | ............... | G06F 12/0846 711/122 |
| 8,261,022 B2* | 9/2012 | Dwyer | ............... | G06F 12/0842 711/134 |
| 8,549,225 B2* | 10/2013 | Blinick | ............... | G06F 12/0804 711/117 |
| 9,274,963 B2* | 3/2016 | Iyengar | ............... | G06F 12/084 |
| 9,569,367 B1* | 2/2017 | Wigmore | ............... | G06F 12/0891 |

* cited by examiner

*Primary Examiner* — John A Lane
(74) *Attorney, Agent, or Firm* — Winston Hsu

(57) ABSTRACT

A method and an apparatus for performing task-level cache management in an electronic device are provided. The method may be applied to a processing circuit of the electronic device, and may include: before a task of a plurality of tasks runs on a processor core, performing at least one checking operation on the task to generate at least one checking result, wherein the at least one checking result indicates whether the task is a risky task with risk of evicting cached data of an urgent task from a cache, and the cache is dedicated to a set of processor cores including the processor core; and according to the at least one checking result, determining whether to temporarily limit cache access permission of the processor core during a time period in which the task runs on the processor core, for preventing cache eviction of the cache due to the task.

20 Claims, 6 Drawing Sheets

METHOD AND APPARATUS FOR PERFORMING TASK-LEVEL CACHE MANAGEMENT IN ELECTRONIC DEVICE

BACKGROUND

The present invention relates to cache control, and more particularly, to a method and an apparatus for performing task-level cache management in an electronic device.

According to the related art, keeping frequently accessed data in a cache may enhance system performance, but this is not always true. For example, the operating system may allocate processing resource for urgent tasks with higher priority, while caches are typically allocated with reference to access frequency only. Among various processing resource allocation, current cache resource is allocated without system-level performance optimization. As a result, there may be a trade-off between processing performance and cache performance. Thus, a novel method and associated architecture are required for enhancing the overall performance of an electronic device.

SUMMARY

One of the objects of the present invention is to provide a method and an apparatus for performing task-level cache management in an electronic device, in order to solve the problems which exist in the related arts.

Another of the objects of the present invention is to provide a method and an apparatus for performing task-level cache management in an electronic device, in order to guarantee the overall performance of the electronic device.

According to at least one embodiment of the present invention, a method for performing task-level cache management in an electronic device is provided, where the method may be applied to a processing circuit of the electronic device. The method may comprise: before a task of a plurality of tasks runs on a processor core, performing at least one checking operation on the task to generate at least one checking result, wherein the at least one checking result indicates whether the task is a risky task with risk of evicting cached data of an urgent task from a cache, and the cache is dedicated to a set of processor cores comprising the processor core within the processing circuit; and according to the at least one checking result, determining whether to temporarily limit cache access permission of the processor core during a time period in which the task runs on the processor core, for preventing cache eviction of the cache due to the task.

According to at least one embodiment of the present invention, an apparatus for performing task-level cache management in an electronic device is provided, where the apparatus may comprises a processing circuit that is arranged to control operations of the electronic device. For example, the processing circuit comprises a plurality of processor cores. In addition, before a task of a plurality of tasks runs on a processor core, the processing circuit performs at least one checking operation on the task to generate at least one checking result, wherein the at least one checking result indicates whether the task is a risky task with risk of evicting cached data of an urgent task from a cache, and the cache is dedicated to a set of processor cores comprising the processor core within the plurality of processor cores. Additionally, according to the at least one checking result, the processing circuit determines whether to temporarily limit cache access permission of the processor core during a time period in which the task runs on the processor core, for preventing cache eviction of the cache due to the task.

The method and associated apparatus of the present invention can solve problems existing in the related arts without introducing unwanted side effects, or in a way that is less likely to introduce a side effect. In addition, the method and associated apparatus of the present invention can properly control operations of the electronic device, to guarantee the overall performance of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
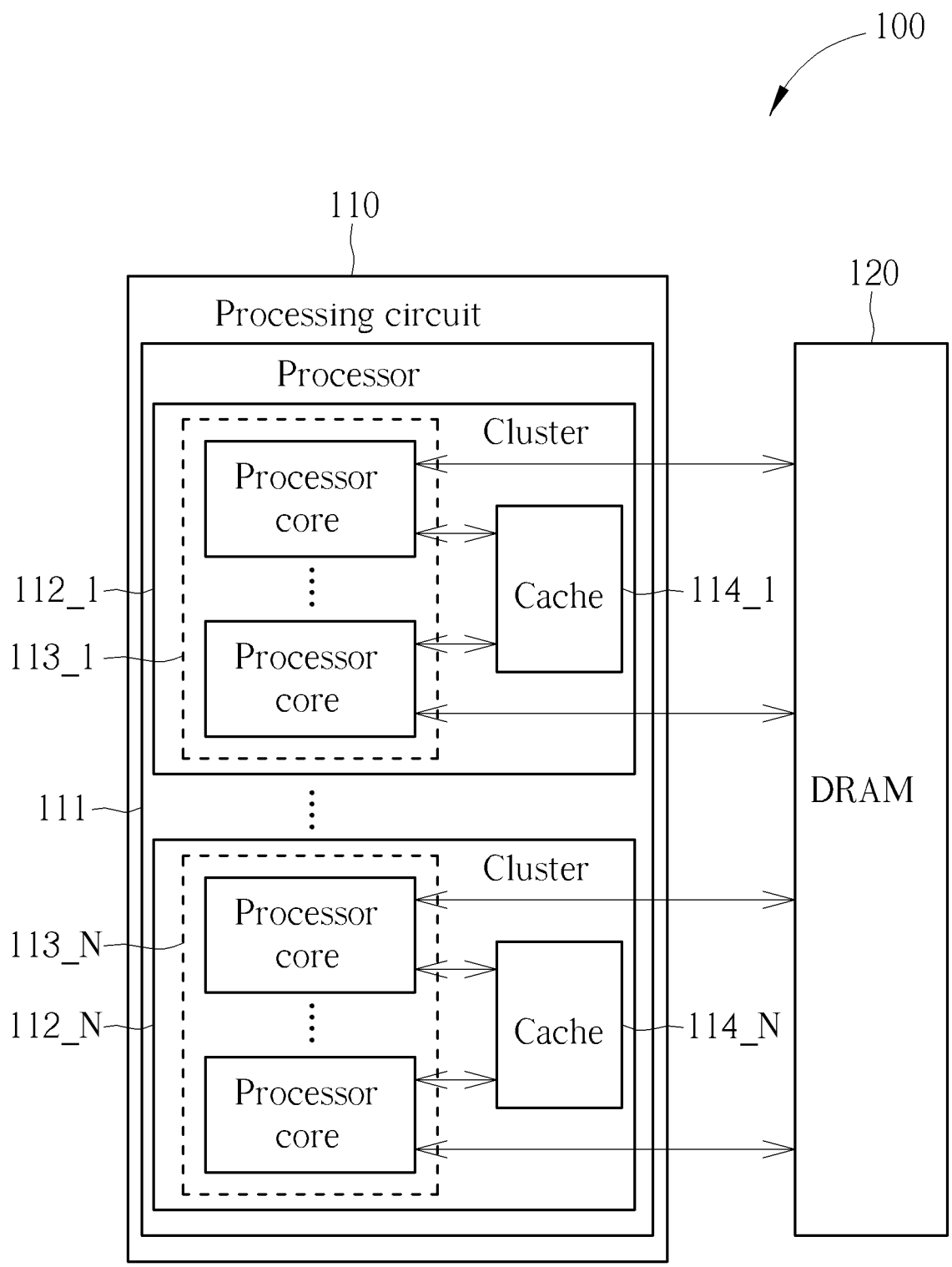
FIG. 1 is a diagram illustrating an apparatus for performing task-level cache management in an electronic device according to an embodiment of the present invention.

FIG. 1 is a diagram illustrating an apparatus 100 for performing task-level cache management in an electronic device according to an embodiment of the present invention. The apparatus 100 may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a tablet, and a personal computer such as a laptop computer.

As shown in FIG. 1, the apparatus 100 may comprise a processing circuit 110 arranged to control operations of the electronic device, and comprise a Dynamic Random Access Memory (DRAM) 120 arranged to store information for the processing circuit 110, and the processing circuit 110 and the DRAM 120 may be positioned in different chips, respectively, but the present invention is not limited thereto. For better comprehension, the above-mentioned mobile phone (e.g. the multifunctional mobile phone) may be taken as an example of the electronic device, and the apparatus 100 may further comprise other components such as a storage device (e.g. a Flash memory module), a display device (e.g. a liquid-crystal display (LCD) panel), an input device (e.g. a touch panel), one or more audio playback device (e.g. speakers), etc., for performing one or more of the operations of the electronic device, where the display device and the input device may be integrated into the same module such as a touch screen. According to this embodiment, the processing circuit 110 may comprise at least one processor (e.g. one or more processors), which may be collectively referred to as the processor 111, and the aforementioned at least one processor such as the processor 111 may comprise a plurality of processor cores. More particularly, the aforementioned at least one processor such as the processor 111 may comprise a plurality of clusters 112_1-112_N (such as the clusters 112_1, . . . and 112_N), and the plurality of clusters 112_1-112_N may comprise a plurality of sets of processor cores 113_1-113_N (such as the processor cores 113_1, . . . and 113_N) and a plurality of caches 114_1-114_N (such as the caches 114_1, . . . and 114_N), respectively, where the notation "N" may represent a positive integer, and the caches 114_1-114_N may be referred to as cache memories. For example, any cluster 112_n of the clusters 112_1-112_N (e.g. the notation "n" may represent a positive integer within the interval [1, N]) may comprise a set of processor cores 113_n and a cache 114_n, and the set of processor cores 113_n in the same cluster such as the cluster 112_n may share the cache 114_n. In addition, when controlling one or more operations of the electronic device, any processor core of the set of processor cores 113_n may access (e.g. read or write) data in the DRAM 120, and may access (e.g. read or write) data in the cache 114_n. Typically, the cache 114_n may cache frequently accessed data when needed.

According to some embodiments, the processing circuit 110 (e.g. a memory control unit therein) may limit cache access permission of any processor core of the set of processor cores 113_n by limiting a number of cache ways of the cache 114_n, such as the ways for being accessed by the processor core, to be a predetermined number of cache ways of the cache 114_n, where the predetermined number of cache ways is less than the total number of cache ways of the cache 114_n.

Figure 2:
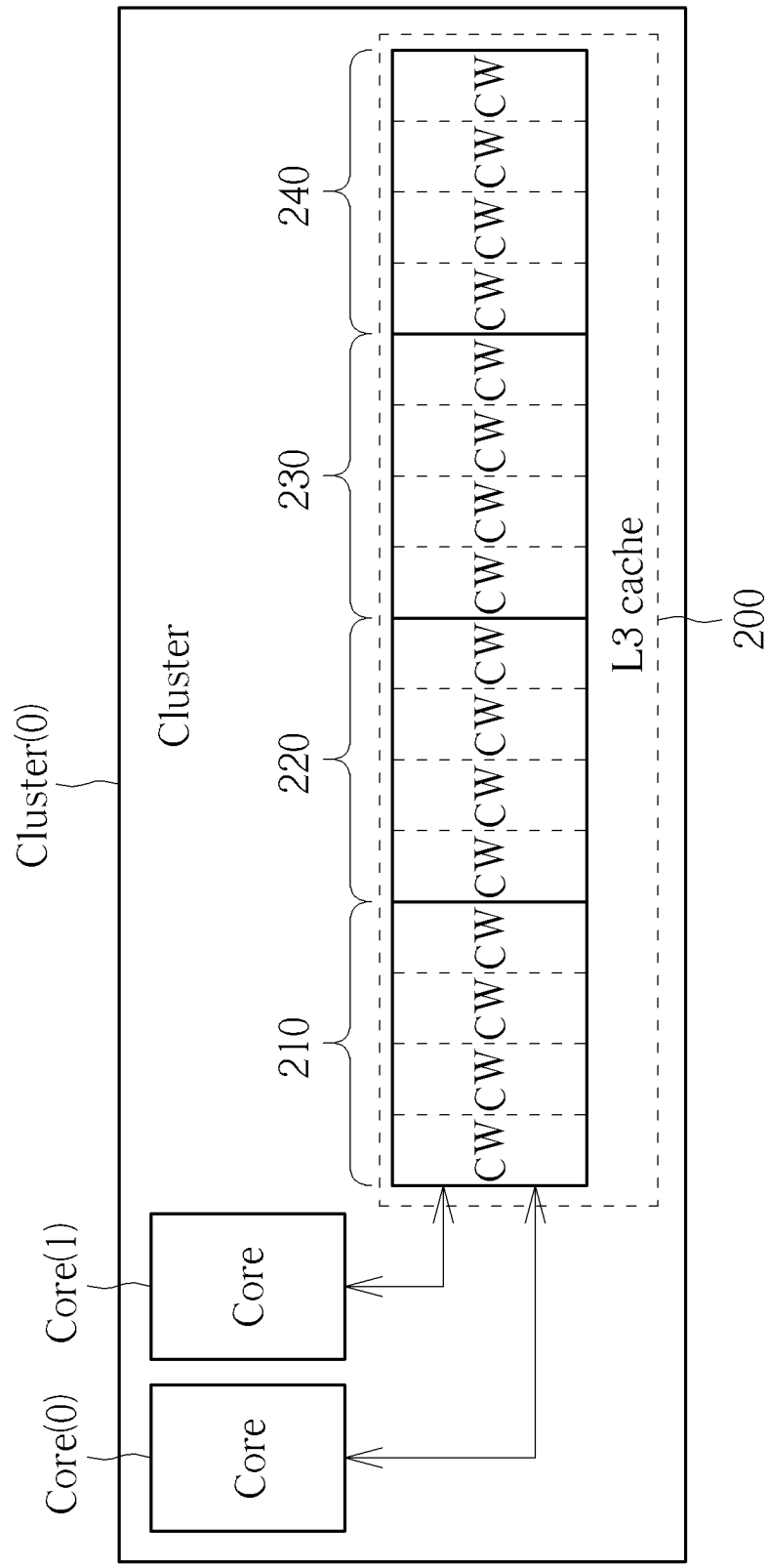
FIG. 2 illustrates some implementation details of the apparatus shown in FIG. 1 according to an embodiment of the present invention.

FIG. 2 illustrates some implementation details of the apparatus 100 shown in FIG. 1 according to an embodiment of the present invention. The cluster Cluster(0) may be taken as an example of the cluster 112_n, the processor cores Core(0) and Core(1) may be taken as an example of the set of processor cores 113_n, and the level-3 (L3) cache 200 may be taken as an example of the cache 114_n. The L3 cache 200 may comprise a plurality of cache ways (labeled "CW" in FIG. 2, for brevity), which may be divided into a plurality of cache control units such as the cache control units 210, 220, 230, and 240. For example, the L3 cache 200 may be partitioned into multiple cache ways (e.g. sixteen cache ways) arranged to be a plurality of sets of cache ways (e.g. four sets of cache ways), and each set of cache ways in the plurality of sets of cache ways may be utilized as a cache control unit. When limiting the cache access permission of a processor core of the processor cores Core(0) and Core(1), the processing circuit 110 may limit the number of cache ways of the cache 200 for being accessed by the processor core (e.g. the number of cache ways accessible by the processor core) to be the predetermined number of cache ways. In this embodiment, the total number of cache ways may be 16, the predetermined number of cache ways may be any of 4, 8, and 12, and the cache ways accessible by the processor core under the cache access permission may be selected from one or more of the cache control units 210, 220, 230, and 240, where the access control of the cache 200 may be implemented with switching control, for example, using some switches controlled by control signals based on associated register settings, but the present invention is not limited thereto. According to some embodiments, the access control of the cache 200 may vary. For example, the predetermined number of cache ways, the total number of cache ways, and/or the number of cache ways in a set of cache ways utilized as a cache control unit may vary.

Figure 3:
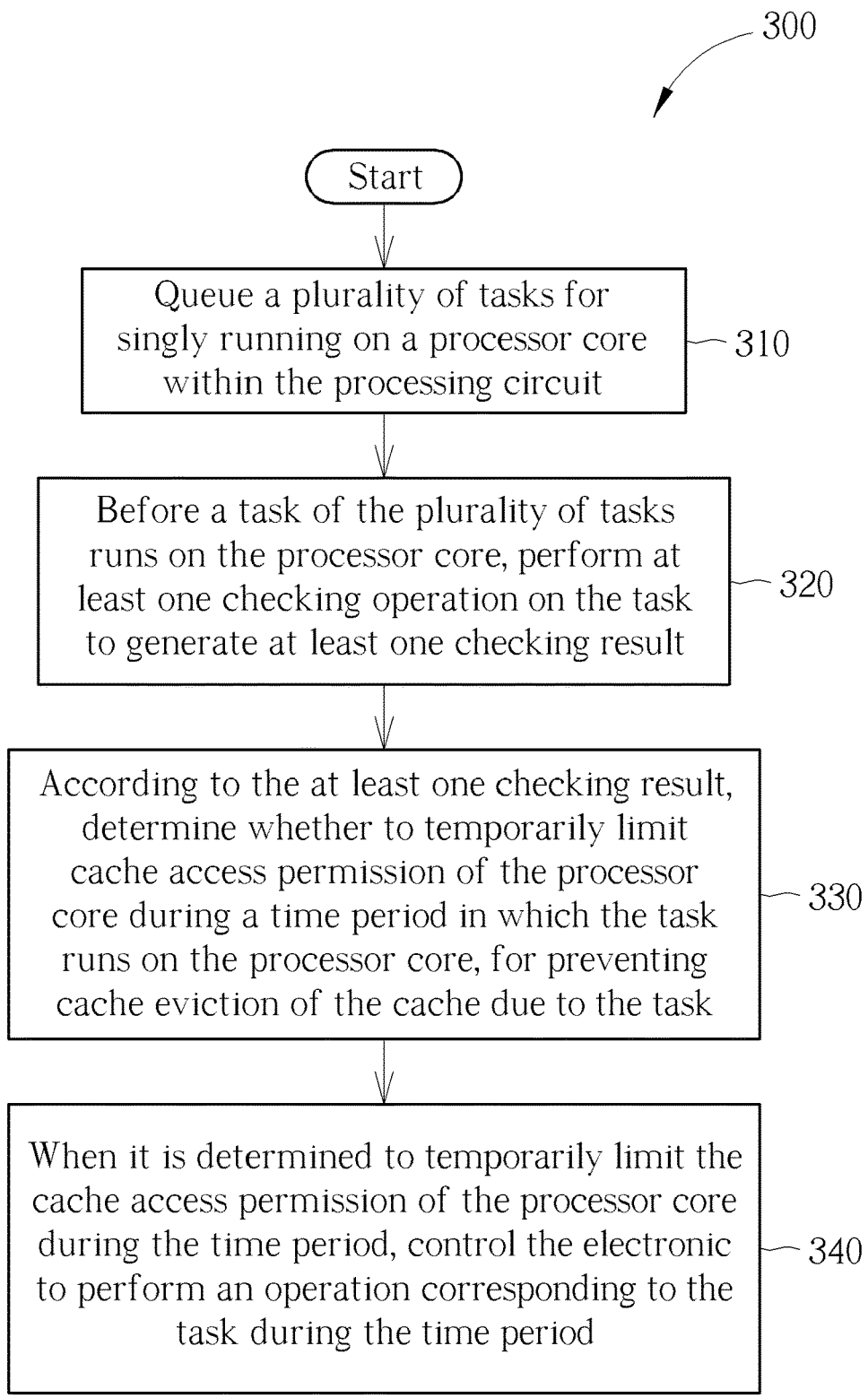
FIG. 3 is a flowchart of a method for performing task-level cache management in an electronic device according to an embodiment of the present invention.

FIG. 3 is a flowchart of a method 300 for performing task-level cache management in an electronic device according to an embodiment of the present invention. The method 300 may be applied to the apparatus 100 shown in FIG. 1. For example, a certain processor core within the plurality of processor cores may run one or more program modules corresponding to the method 300 to control according to the method 300, but the present invention is not limited thereto. The method 300 may be described as follows.

In Step 310, the processing circuit 110 may queue a plurality of tasks for singly (e.g. one by one) running on a processor core within the processing circuit 110. For better comprehension, the processor core may represent any processor core of the set of processor cores 113_n, such as the aforementioned processor core of the processor cores Core (0) and Core (1) shown in FIG. 2, but the present invention is not limited thereto.

In Step 320, before a task of the plurality of tasks runs on the processor core, the processing circuit 110 (e.g. the certain processor core running the one or more program modules) may perform at least one checking operation (e.g. one or more checking operations) on the task to generate at least one checking result (e.g. one or more checking results), where the aforementioned at least one checking result may indicate whether the task is a risky task with risk of evicting cached data of an urgent task from a cache. For example, in a situation where the processor core is one of the set of processor cores 113_n, this cache may represent the cache 114_n. More particularly, the cache 114_n (e.g. the L3 cache 200) may be dedicated to the set of processor cores 113_n (e.g. the processor cores Core(0) and Core (1)).

In Step 330, according to the aforementioned at least one checking result, the processing circuit 110 (e.g. the certain processor core running the one or more program modules) may determine whether to temporarily limit cache access permission of the processor core during a time period in which the task runs on the processor core, for preventing cache eviction of the cache due to the task. For example, when determining to temporarily limit the cache access permission of the processor core such as the one of the set of processor cores 113_n during this time period, the processing circuit 110 (e.g. the certain processor core running the one or more program modules) may temporarily limit the number of cache ways of the cache 114_n for being accessed by the processor core to be the predetermined number of cache ways, but the present invention is not limited thereto.

In Step 340, when it is determined to temporarily limit the cache access permission of the processor core during the time period, the processing circuit 110 may control the electronic to perform an operation corresponding to the task during the time period, for example, with the cache access permission being limited to the predetermined number of cache ways of the cache, where the predetermined number of cache ways is less than the total number of cache ways of the cache.

For better comprehension, the method 300 may be illustrated with the working flow shown in FIG. 3, but the present invention is not limited thereto. According to some embodiments, one or more steps may be added, deleted, or changed in the working flow shown in FIG. 3.

Figure 4:
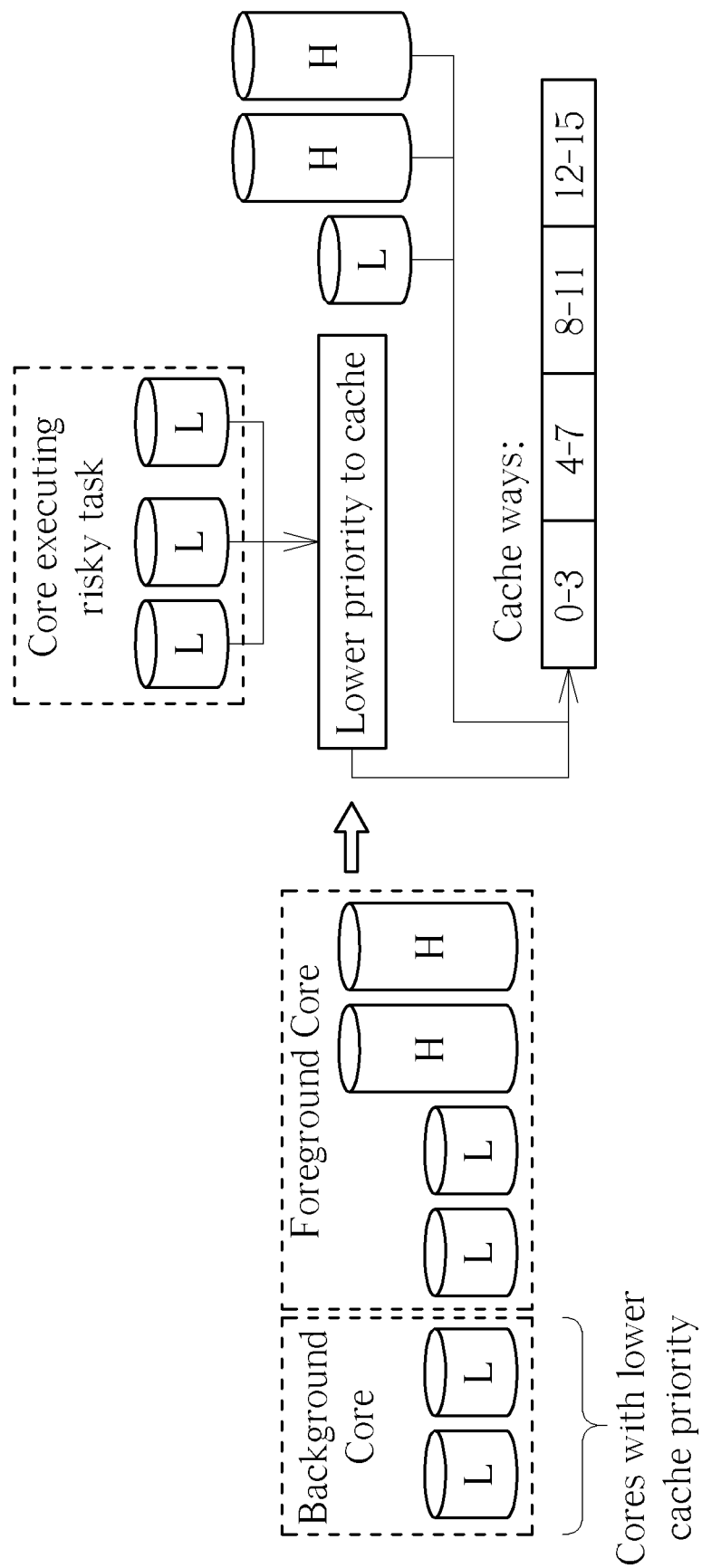
FIG. 4 illustrates a control scheme of the method shown in FIG. 3 according to an embodiment of the present invention.

FIG. 4 illustrates a control scheme of the method 300 shown in FIG. 3 according to an embodiment of the present invention, where the four sets of cache ways 0-3, 4-7, 8-11, and 12-15 shown around the lower right corner of FIG. 4 may be taken as examples of the plurality of sets of cache ways mentioned above. In FIG. 4, the cylinders may represent some processor cores of predetermined hardware resources capacity (labeled "L" and "H" which stand for lower and higher hardware resources capacity, respectively), and certain tasks may run on these processor cores as shown in the blocks illustrated with dashed lines, respectively. Regarding the left half of FIG. 4, the background core may represent processor cores running background tasks, and the foreground core may represent processor cores running foreground tasks. For example, arranging which tasks to run on which processor cores may depend on some existing rules in an operating system (OS) of the electronic device, but the present invention is not limited thereto.

Based on the method 300, the processing circuit 110 may dynamically adjust the cache access permission according to the method 300 (e.g. changing the cores with lower cache priority and/or changing priority of one or more cores executing background tasks to have lower priority to the cache) without interfering with the existing rules, for example, through temporarily limiting the cache access permission of the processor cores executing or running risky tasks (labeled "Core executing risky task" in FIG. 4, for brevity) such as risky background tasks, etc., but the present invention is not limited thereto. As the existing rules will not be changed, the method and associated apparatus of the present invention can solve problems existing in the related arts without introducing unwanted side effects, or in a way that is less likely to introduce a side effect. More particularly, when determining to temporarily limit the cache access permission of the processor core such as the one of the set of processor cores 113_n during the time period, the processing circuit 110 may temporarily limit the number of cache ways of the cache 114_n for being accessed by the processor core to be the predetermined number of cache ways, such as 4, 8, or 12. For example, when the predetermined number of cache ways is equal to 4, the processor core may access only one set of cache ways within the four sets of cache ways 0-3, 4-7, 8-11, and 12-15 during the time period. In this situation, the task running on the processor core may utilize the one set of cache ways, rather than the other sets of cache ways within the four sets of cache ways 0-3, 4-7, 8-11, and 12-15. For another example, when the predetermined number of cache ways is equal to 8, the processor core may access only two sets of cache ways within the four sets of cache ways 0-3, 4-7, 8-11, and 12-15 during the time period. In this situation, the task running on the processor core may utilize the two sets of cache ways, rather than the other sets of cache ways within the four sets of cache ways 0-3, 4-7, 8-11, and 12-15. For yet another example, when the predetermined number of cache ways is equal to 12, the processor core may access only three sets of cache ways within the four sets of cache ways 0-3, 4-7, 8-11, and 12-15 during the time period. In this situation, the task running on the processor core may utilize the three sets of cache ways, rather than the other set of cache ways within the four sets of cache ways 0-3, 4-7, 8-11, and 12-15.

According to this embodiment, the processing circuit 110 may perform task-level cache access control, and may enable cache access limitation of some processor cores within the processing circuit 110 when certain tasks (e.g. target tasks) are running on these processor cores. More particularly, the processing circuit 110 may monitor any task to selectively apply or release (remove) cache access limitation. Taking the task mentioned in Step 320 as an example, the processing circuit 110 may monitor the task, and may apply cache access limitation to the processor core (e.g. limit the number of cache ways of the cache 114_n for being accessed by the processor core to be the predetermined number of cache ways) before the task is going to run on the processor core, and release the cache access limitation after the task just stops running on the processor core.

Figure 5:
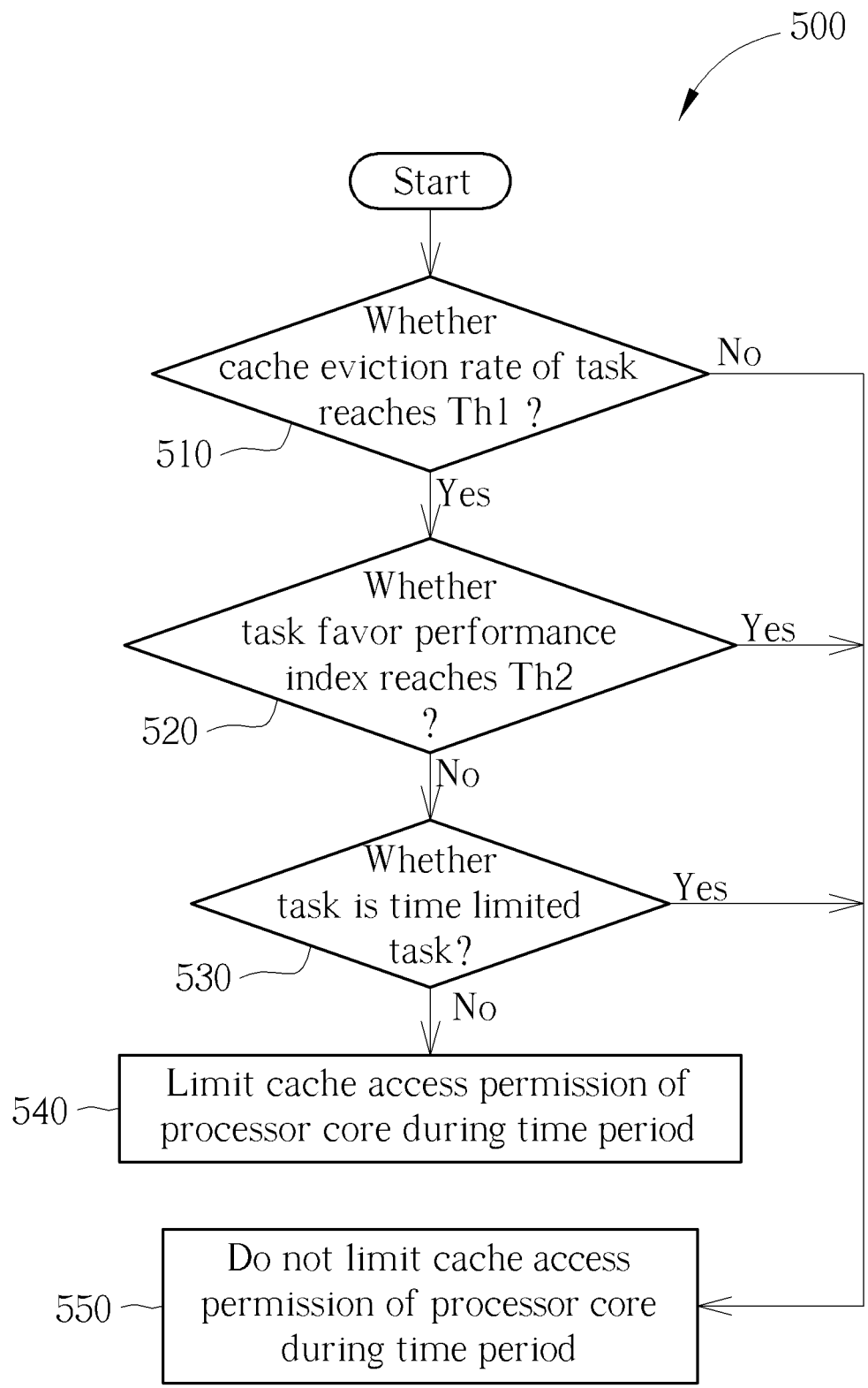
FIG. 5 illustrates a working flow of the method shown in FIG. 3 according to an embodiment of the present invention.

FIG. 5 illustrates a working flow 500 of the method 300 shown in FIG. 3 according to an embodiment of the present invention. The operations of Steps 510, 520, and 530 may be taken as examples of the aforementioned at least one checking operation of Step 320, and the operations of Steps 540 and 550 may be taken as examples of the aforementioned at least one checking operation of Step 330.

In Step 510, the processing circuit 110 (e.g. the certain processor core running the one or more program modules) may check whether a cache eviction rate of the task reaches (more particularly, is greater than or equal to) a first predetermined threshold Th1, to generate a first checking result within the aforementioned at least one checking result. According to this embodiment, the cache eviction rate of the task may correspond to historical statistics of a monitored factor regarding a behavior that the task evicts data of one or more other tasks, where the processing circuit 110 may monitor the monitored factor, and may store and update the monitored factor. Examples of the monitored factor may include, but are not limited to: the number of times of cache eviction due to the task, the amount of data of cache eviction due to the task, etc. When the first checking result indicates that the cache eviction rate of the task reaches the first predetermined threshold Th1, Step 520 is entered; otherwise, Step 550 is entered.

In Step 520, when the first checking result indicates that the cache eviction rate of the task reaches the first predetermined threshold Th1, the processing circuit 110 (e.g. the certain processor core running the one or more program modules) may check whether a task favor performance index of the task reaches (more particularly, is greater than or equal to) a second predetermined threshold Th2, to generate a second checking result within the aforementioned at least one checking result. According to this embodiment, the plurality of tasks may be classified into a plurality of groups according to at least one predetermined rule in advance, respectively, and the task favor performance index of the task may be related to whether the task belongs to a predetermined group within the groups, where classifying the tasks into the groups may be performed by the processing circuit 110 under control of the OS, but the present invention is not limited thereto. When the second checking result indicates that the task favor performance index of the task reaches the second predetermined threshold Th2, Step 550 is entered; otherwise, Step 530 is entered.

In Step 530, when the second checking result indicates that the task favor performance index of the task does not reach the second predetermined threshold Th2, the processing circuit 110 (e.g. the certain processor core running the one or more program modules) may check whether the task is a time limited task, to generate a third checking result within the aforementioned at least one checking result. For example, the processing circuit 110 may determine whether the task is a time limited task according to whether the task is one of specific types of tasks. When the task is one of the specific types of tasks, the processing circuit 110 may determine that the task is a time limited task; otherwise, the processing circuit 110 may determine that the task is not a time limited task. Examples of the specific types of tasks may include, but are not limited to: a real time (RT)-tasks, a frame-per-second (fps) tracking tasks, a user-deadline task having a user-defined deadline, etc. When the third checking result indicates that the task is a time limited task, Step 550 is entered; otherwise, Step 540 is entered.

In Step 540, the processing circuit 110 (e.g. the certain processor core running the one or more program modules) may limit the cache access permission of processor core during the time period. According to this embodiment, when the third checking result indicates that the task is not a time limited task, the processing circuit 110 may determine to temporarily limit the cache access permission of the processor core during the time period, and more particularly, may limit the cache access permission to the predetermined number of cache ways of the cache during the time period, to prevent the cache eviction of the cache due to the task.

In Step 550, the processing circuit 110 (e.g. the certain processor core running the one or more program modules) does not limit the cache access permission of processor core during the time period. According to this embodiment, when the third checking result indicates that the task is a time limited task, the processing circuit 110 may prevent limiting the cache access permission of processor core during the time period.

Based on the working flow 500, when the aforementioned at least one checking result indicates that a predetermined condition (e.g. the condition that each of the following is true: the cache eviction rate of the task reaches the first predetermined threshold Th1; the task favor performance index of the task does not reach the second predetermined threshold Th2; and the task is not a time limited task) is satisfied, the processing circuit may determine to temporarily limit the cache access permission of the processor core during the time period, to prevent the cache eviction of the cache due to the task. According to this embodiment, the processing circuit 110 may monitor the cache eviction rate, etc. of the task. When the aforementioned at least one checking result indicates that the task is a risky task with risk of evicting cached data of an urgent task from a cache (e.g. this task will evict a significant amount of cached data), the processing circuit 110 may limit the accessible number of cache ways of the cache, to prevent important data (e.g. data of urgent tasks) in the shared cache of the same cluster from being evicted by the task, and therefore can guarantee the performance of urgent tasks.

For better comprehension, some operations of the method 300 may be illustrated with the working flow 500 shown in FIG. 5, but the present invention is not limited thereto. According to some embodiments, one or more steps may be added, deleted, or changed in the working flow 500.

According to some embodiments, the processing circuit 110 may determine the cache eviction rate of the task at least according to the latest value in a predetermined register of a performance monitor unit (PMU) within the processing circuit 110, where the monitored factor may be stored in the predetermined register, but the present invention is not limited thereto. For example, the processing circuit 110 may determine the cache eviction rate of the task according to the latest value in the predetermined register and other hardware information of other hardware circuit within the processing circuit 110. In some embodiments, the processing circuit 110 may adjust the first predetermined threshold Th1 according to at least one system index (e.g. one or more system indexes) of the electronic device. Examples of the aforementioned at least one system index may include, but are not limited to: PMU index of the PMU, L3 cache eviction rate, DRAM latency, etc. In some embodiments, the processing circuit 110 may determine the first predetermined threshold Th1 according to a user hint or a user setting. In some embodiments, the processing circuit 110 may utilize the first predetermined threshold Th1 as a per-group threshold, such as a threshold depending on a corresponding task group. For example, the task group may be determined according to a task group definition of the OS. For another example, the task group may be determined according to another group definition such as that of the manufacturer of the electronic device.

According to some embodiments, the plurality of groups may comprise at least one non-urgent group (e.g. one or more non-urgent groups) and at least one urgent group (e.g. one or more urgent groups). For example, the aforementioned at least one non-urgent group comprises non-urgent tasks within the plurality of tasks, and the aforementioned at least one urgent group comprises urgent tasks within the plurality of tasks. In Step 520, the processing circuit 110 may determine the task favor performance index of the task at least according to whether the task belongs to a group within the aforementioned at least one non-urgent group, where the group may be taken as an example of the predetermined group, but the present invention is not limited thereto. The task favor performance index of the task may be implemented as an importance score of the task. For example, when the task belongs to the group within the aforementioned at least one non-urgent group, the importance score may be lower, and more particularly, for the case that there are multiple non-urgent groups, the importance score may depend on a predetermined importance value of this group among others of the non-urgent groups. For another example, when the task belongs to any group of the aforementioned at least one urgent group, the importance score may be higher, and more particularly, for the case that there are multiple urgent groups, the importance score may depend on a predetermined importance value of this group among others of the urgent groups. In some embodiments, the processing circuit 110 may determine the task favor performance index of the task according to whether the task belongs to the group within the aforementioned at least one non-urgent group and according to whether the task works for one or more important tasks such as one or more urgent tasks. In some embodiments, the processing circuit 110 may determine the task favor performance index of the task according to whether the task belongs to the group within the aforementioned at least one non-urgent group and/or according to a user hint related to the task.

According to some embodiments, tasks executions may be combination(s) of arithmetic, logic condition and data fetch, which may be collectively referred to as task context.

As the plurality of tasks in queue may run, one by one, on the processor core mentioned in Step 310, context switch of the task context may occur when one of the tasks stops running on the processor core and another of the tasks is going to run the processor core.

Figure 6:
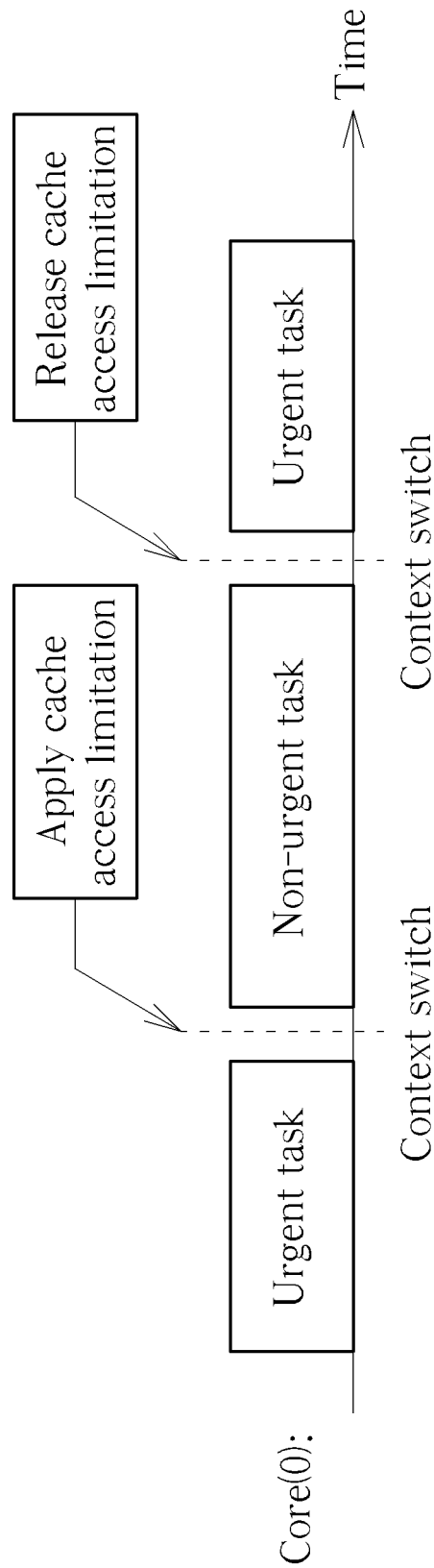
FIG. 6 illustrates some implementation details of the method shown in FIG. 3 according to an embodiment of the present invention.

FIG. 6 illustrates some implementation details of the method 300 shown in FIG. 3 according to an embodiment of the present invention. The horizontal axis shown in FIG. 6 may represent time. For better comprehension, the task mentioned in Step 320 may be a non-urgent task, and may be queued to run on the processor core Core(0), where both of the previous task and the next task in the task queue may be urgent tasks, but the present invention is not limited thereto. The processing circuit 110 may monitor the task such as the non-urgent task, and may apply cache access limitation to the processor core Core(0) (e.g. limit the number of cache ways of the cache 200 for being accessed by the processor core Core(0) to be the predetermined number of cache ways) at the time point of context switch before the task is going to run on the processor core Core(0), and release the cache access limitation at the time point of context switch after the task just stops running on the processor core Core(0). For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing task-level cache management in an electronic device, the method being applied to a processing circuit of the electronic device, the method comprising:
    before a task of a plurality of tasks runs on a processor core, performing at least one checking operation on the task to generate at least one checking result, wherein the at least one checking result indicates whether the task is a risky task with risk of evicting cached data of an urgent task from a cache, and the cache is dedicated to a set of processor cores comprising the processor core within the processing circuit; and
    according to the at least one checking result, determining whether to temporarily limit cache access permission of the processor core during a time period in which the task runs on the processor core, for preventing cache eviction of the cache due to the task.

2. The method of claim 1, wherein the processing circuit comprises a plurality of clusters, the plurality of clusters comprises a plurality of sets of processor cores, respectively, and the set of processor cores is one set within the plurality of sets of processor cores.

3. The method of claim 2, wherein the set of processor cores and the cache are positioned within a cluster of the plurality of clusters.

4. The method of claim 1, wherein the step of performing the at least one checking operation on the task to generate the at least one checking result further comprises:
    checking whether a cache eviction rate of the task reaches a first predetermined threshold, to generate a first checking result within the at least one checking result.

5. The method of claim 4, wherein the cache eviction rate of the task corresponds to historical statistics of a monitored factor regarding a behavior that the task evicts data of one or more other tasks.

6. The method of claim 4, further comprising:
    determining the cache eviction rate of the task at least according to a latest value in a predetermined register of a performance monitor unit within the processing circuit.

7. The method of claim 6, further comprising:
    determining the cache eviction rate of the task according to the latest value in the predetermined register and other hardware information of other hardware circuit within the processing circuit.

8. The method of claim 4, further comprising:
    adjusting the first predetermined threshold according to at least one system index of the electronic device.

9. The method of claim 4, wherein the plurality of tasks are classified into a plurality of groups according to at least one predetermined rule in advance, respectively; the plurality of groups comprise at least one non-urgent group and at least one urgent group; and the step of performing the at least one checking operation on the task to generate the at least one checking result further comprises:
    when the first checking result indicates that the cache eviction rate of the task reaches the first predetermined threshold, checking whether a task favor performance index of the task reaches a second predetermined threshold, to generate a second checking result within the at least one checking result, wherein the task favor performance index of the task is determined at least according to whether the task belongs to a group within the at least one non-urgent group.

10. The method of claim 9, wherein the at least one non-urgent group comprises non-urgent tasks within the plurality of tasks, and the at least one urgent group comprises urgent tasks within the plurality of tasks.

11. The method of claim 9, wherein the step of performing the at least one checking operation on the task to generate the at least one checking result further comprises:
    when the second checking result indicates that the task favor performance index of the task does not reach the second predetermined threshold, checking whether the task is a time limited task, to generate a third checking result within the at least one checking result.

12. The method of claim 11, wherein step of determining whether to temporarily limit the cache access permission of the processor core during the time period in which the task runs on the processor core further comprises:
    when the third checking result indicates that the task is not a time limited task, determining to temporarily limit the cache access permission of the processor core during the time period, to prevent the cache eviction of the cache due to the task.

13. The method of claim 1, wherein step of determining whether to temporarily limit the cache access permission of the processor core during the time period in which the task runs on the processor core further comprises:
    when the at least one checking result indicates that a predetermined condition is satisfied, determining to temporarily limit the cache access permission of the processor core during the time period, to prevent the cache eviction of the cache due to the task.

14. The method of claim 1, further comprising:
    when it is determined to temporarily limit the cache access permission of the processor core during the time period, controlling the electronic to perform an operation corresponding to the task during the time period with the cache access permission being limited to a predetermined number of cache ways of the cache, wherein the predetermined number of cache ways is less than a total number of cache ways of the cache.

15. The method of claim 1, wherein limiting the cache access permission of the processor core comprises limiting a number of cache ways of the cache for being accessed by the processor core to be a predetermined number of cache ways of the cache, wherein the predetermined number of cache ways is less than a total number of cache ways of the cache.

16. An apparatus for performing task-level cache management in an electronic device, the apparatus comprising:

a processing circuit, arranged to control operations of the electronic device, wherein the processing circuit comprises a plurality of processor cores, wherein:

before a task of a plurality of tasks runs on a processor core, the processing circuit performs at least one checking operation on the task to generate at least one checking result, wherein the at least one checking result indicates whether the task is a risky task with risk of evicting cached data of an urgent task from a cache, and the cache is dedicated to a set of processor cores comprising the processor core within the plurality of processor cores; and according to the at least one checking result, the processing circuit determines whether to temporarily limit cache access permission of the processor core during a time period in which the task runs on the processor core, for preventing cache eviction of the cache due to the task.

17. The apparatus of claim 16, wherein the processing circuit comprises a plurality of clusters, the plurality of clusters comprises a plurality of sets of processor cores, respectively, and the set of processor cores is one set within the plurality of sets of processor cores.

18. The apparatus of claim 16, wherein the processing circuit checks whether a cache eviction rate of the task reaches a first predetermined threshold, to generate a first checking result within the at least one checking result.

19. The apparatus of claim 16, wherein when the at least one checking result indicates that a predetermined condition is satisfied, the processing circuit determines to temporarily limit the cache access permission of the processor core during the time period, to prevent the cache eviction of the cache due to the task.

20. The apparatus of claim 16, wherein when it is determined to temporarily limit the cache access permission of the processor core during the time period, the processing circuit controls the electronic to perform an operation corresponding to the task during the time period with the cache access permission being limited to a predetermined number of cache ways of the cache, wherein the predetermined number of cache ways is less than a total number of cache ways of the cache.

* * * * *